United States Patent
Singa Ramalingam et al.

(10) Patent No.: US 12,099,860 B1
(45) Date of Patent: Sep. 24, 2024

(54) SYSTEMS AND METHODS FOR AN ENHANCED SUPPORT SESSION USING AN ARTIFICIAL INTELLIGENCE-BASED CONVERSATIONAL ASSISTANT

(71) Applicant: Verizon Patent and Licensing Inc., Basking Ridge, NJ (US)

(72) Inventors: RajeshKhanna Singa Ramalingam, Dayton, NJ (US); Kumaradevan Chandrabose, Basking Ridge, NJ (US); Deenaraj Joshi Jangam, Basking Ridge, NJ (US); Srinivasa Kaniganti, Frisco, TX (US); Sankar Shanmugam, Dayton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/186,702

(22) Filed: Mar. 20, 2023

(51) Int. Cl.
*G06F 9/451* (2018.01)
*G06F 3/0484* (2022.01)
*G06N 3/006* (2023.01)

(52) U.S. Cl.
CPC .......... *G06F 9/453* (2018.02); *G06F 3/0484* (2013.01); *G06N 3/006* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 11,606,463 B1* | 3/2023 | Yeracaris | G06Q 30/015 |
| 2013/0185448 A1* | 7/2013 | Morelli | H04L 67/141 |
| | | | 709/228 |
| 2014/0274200 A1* | 9/2014 | Olson | H04B 1/3877 |
| | | | 455/552.1 |
| 2015/0334068 A1* | 11/2015 | Liu | G06F 16/287 |
| | | | 707/738 |
| 2019/0138943 A1* | 5/2019 | Akolkar | G06N 5/022 |
| 2020/0137170 A1* | 4/2020 | Hassler | H04L 67/141 |
| 2021/0035228 A1* | 2/2021 | Silvestre | G06Q 40/08 |
| 2022/0116485 A1* | 4/2022 | Gandhi | H04L 51/216 |
| 2022/0210033 A1* | 6/2022 | Higgins | H04L 41/5093 |

* cited by examiner

*Primary Examiner* — Di Xiao

(57) ABSTRACT

In some implementations, a support system may receive, from a user device, a support request to setup a support session. The support system may establish the support session based on the support request by enabling support communications associated with the support session to be exchanged between a terminal device associated with the support system and the user device. The support system may determine an intent associated with the support session by using artificial intelligence processing to process one or more utterances received from the user device. The support system may provide, to the terminal device, a delegation message that includes an option to enable the support communications associated with the support session to be exchanged between the user device and an assisting device associated with the support system. The assisting device may execute an automated support agent. The support system may provide one or more support messages generated by the automated support agent to the user device based on a selection of the option included in the delegation message.

20 Claims, 6 Drawing Sheets

SYSTEMS AND METHODS FOR AN ENHANCED SUPPORT SESSION USING AN ARTIFICIAL INTELLIGENCE-BASED CONVERSATIONAL ASSISTANT

BACKGROUND

A support system is used to provide support to a user during a support session. In a support session, a live agent (e.g., a person associated with the support system) often communicates with the user to provide support to the user during the session. For example, a live chat agent may communicate with a user (e.g., via a live chat interface associated with the support system) to respond to a request of the user, to provide guidance to the user, and/or to provide assistance to the user, among other examples). In a support session, the live agent often uses a variety of tools to provide support to the user. For example, the live agent may use communication tools, information management tools, and/or information processing tools associated with the support system to provide support to the user during the support session.

DETAILED DESCRIPTION OF EXAMPLE EMBODIMENTS

Figure 1A:
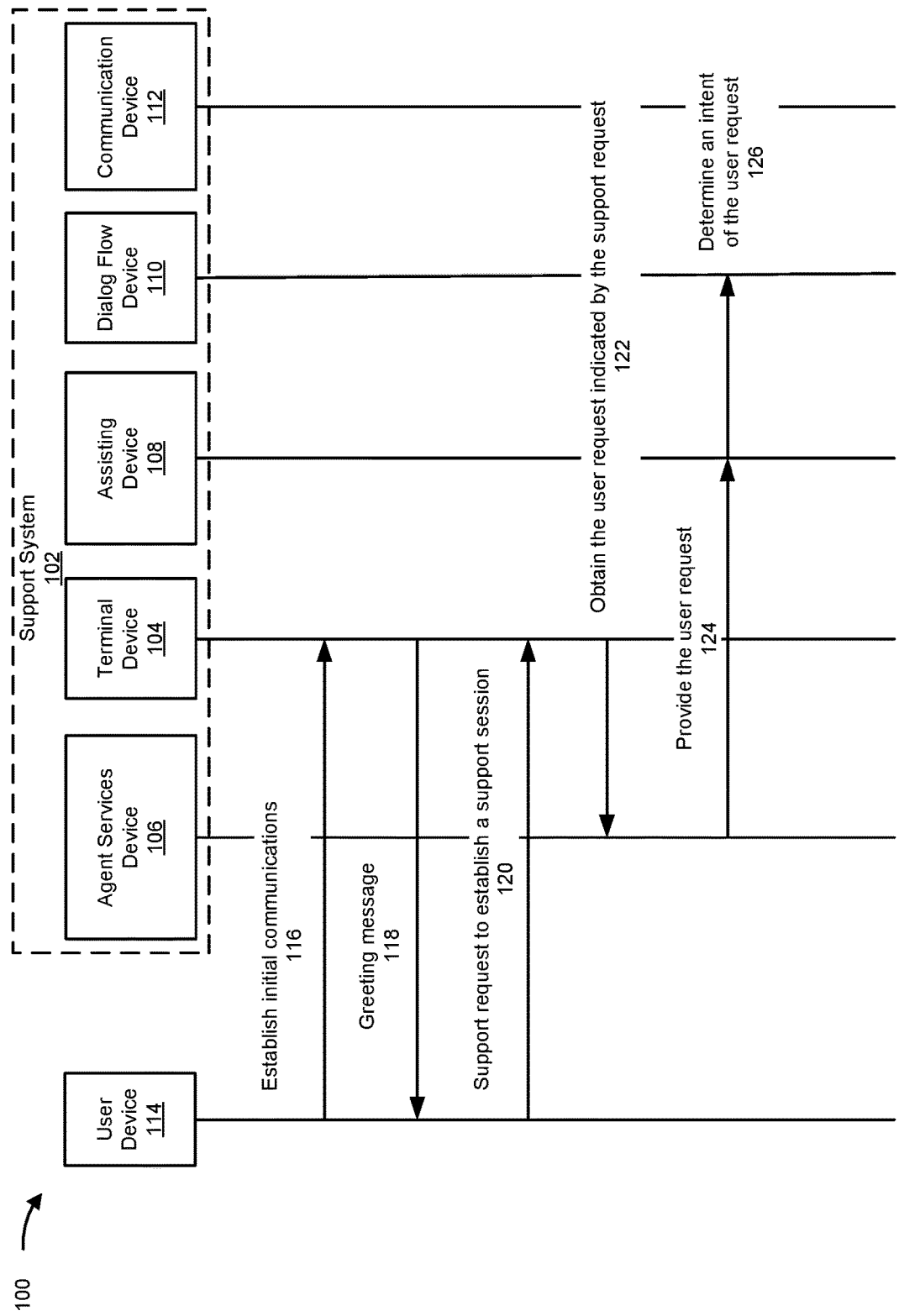
FIGS. 1A-1B are diagrams of an example associated with an enhanced support session using an artificial intelligence (AI)-based conversational assistant.

The following detailed description of example implementations refers to the accompanying drawings. The same reference numbers in different drawings may identify the same or similar elements.

A support system is used to provide support to a user during a support session. For example, a live agent (e.g., a live chat agent) associated with the support system may provide assistance, information, and/or services to the user during the support session. As an example, the live agent may operate a terminal device to communicate with a user device of the user via a communication modality (e.g., the live agent may use the terminal device to communicate with the user device via a live chat interface or another suitable interface associated with the support system). For example, the live agent may provide technical support services to the user (e.g., the live agent may answer a question of the user and/or may provide a recommendation to the user, among other examples) during the support session. As another example, the live agent may provide customer support services to the user (e.g., the live agent may respond to a request of the user, troubleshoot an issue associated with the user, and/or offer a solution to a problem associated with the user, among other examples) during the support session.

The support system is often associated with one or more information technology tools that enable the live agent to provide support to the user during the support session (e.g., the live agent uses the one or more information technology tools to perform an action based on a request indicated by the user). For example, the live agent can use the one or more information technology tools to obtain information, process information, and/or generate information associated with the user, the user device, and/or the support session. However, in some cases, using the one or more information technology tools may cause negative impacts associated with providing support to the user during the support session.

For example, if the live agent uses an information technology tool (e.g., associated with the support system) that causes a duration of the support session to be extended (e.g., because of operations that are performed based on using the information technology tool), then resources (e.g., computing resources, memory resources, network resources, server-side resources, and/or user-side resources, among other examples) are consumed during the extended duration of the support session. Additionally, or alternatively, in some cases, the support system enables the live agent to provide support to multiple users (e.g., by establishing concurrent support sessions between the terminal device of the live agent and the user devices of the users).

However, if the live agent uses an information technology tool (associated with the support system) that prevents the live agent from performing another task (e.g., when the live agent is using the information technology tool), then an ability of the live agent to provide support to users associated with concurrent support sessions is reduced (e.g., because the live agent cannot interact with the users when the live agent is performing operations associated with using the information technology tool). As a result, inefficiencies associated with providing support to the users are introduced and user wait times associated with the support session are increased, which further consumes resources.

Some implementations described herein enable an enhanced support session using an AI-based conversational assistant. For example, a support system may receive, from a user device, a support request to setup a support session. The support system may establish the support session based on the support request. As an example, the support system may establish the support session by enabling support communications associated with the support session to be exchanged between a terminal device (e.g., that is operated by a live agent) associated with the support system and the user device. The support system may determine an intent associated with the support session.

For an example, one or more AI-based conversational assistants, virtual agents, and/or automated agents may determine the intent associated with the support session using AI processing to process one or more utterances received from the user device (e.g., received as text converted from the one or more utterances). As an example, the one or more AI-based conversational assistants, virtual agents, and/or automated support agents (e.g., executing on one or more devices associated with the support system) may be one or more computer programs that are designed to simulate human conversation and/or to provide automated customer service and/or support associated with the support session. In other words, the one or more AI-based conversational assistants, virtual agents, and/or automated support agents may simulate human conversation and/or may provide customer service support and/or services associated with the user device and/or the support system.

The support system may provide, to the terminal device, a delegation message that includes an option to enable the support communications associated with the support session to be exchanged between the user device and an assisting device (e.g., an AI-based conversational assistant) associated with the support system. The assisting device may be associated with an automated support agent. The support system may provide one or more support messages generated by the automated support agent to the user device based on the live agent selecting the option included in the delegation message. In some implementations, the support messages generated by the automated agent and support messages provided by the live agent may both be delivered to the user device in a single interface (e.g., that is provided by the support system), so that the user is given the impression that only the live agent is providing support messages. Additionally, or alternatively, the one or more support messages generated by the automated agent may also be provided to the terminal device (e.g., provided for display to the live agent), so that the live agent may understand a context associated with the support session (e.g., because the live agent can view the one or more support messages provided to the user device by the assisting device).

In this way, the support system enables the live agent to provide support to one or more users more efficiently (e.g., because the assisting device automatically performs operations that would have otherwise been performed less efficiently or less accurately by the live agent). For example, the assisting device may use AI-based techniques to automatically obtain information, analyze information (e.g., to understand the information), generate information (e.g., support communications and/or support responses), and/or perform tasks that otherwise would have to be performed by the live agent. As a result, a duration of support sessions may be shortened (e.g., relative to support sessions in which with the live agent using the information technology tools to perform all tasks associated with the support session), which conserves resources. Furthermore, because the live agent does not perform tasks that are performed by the assisting device, the live agents is able to more efficiently provide support to multiple users during concurrent support sessions.

Figure 1B:
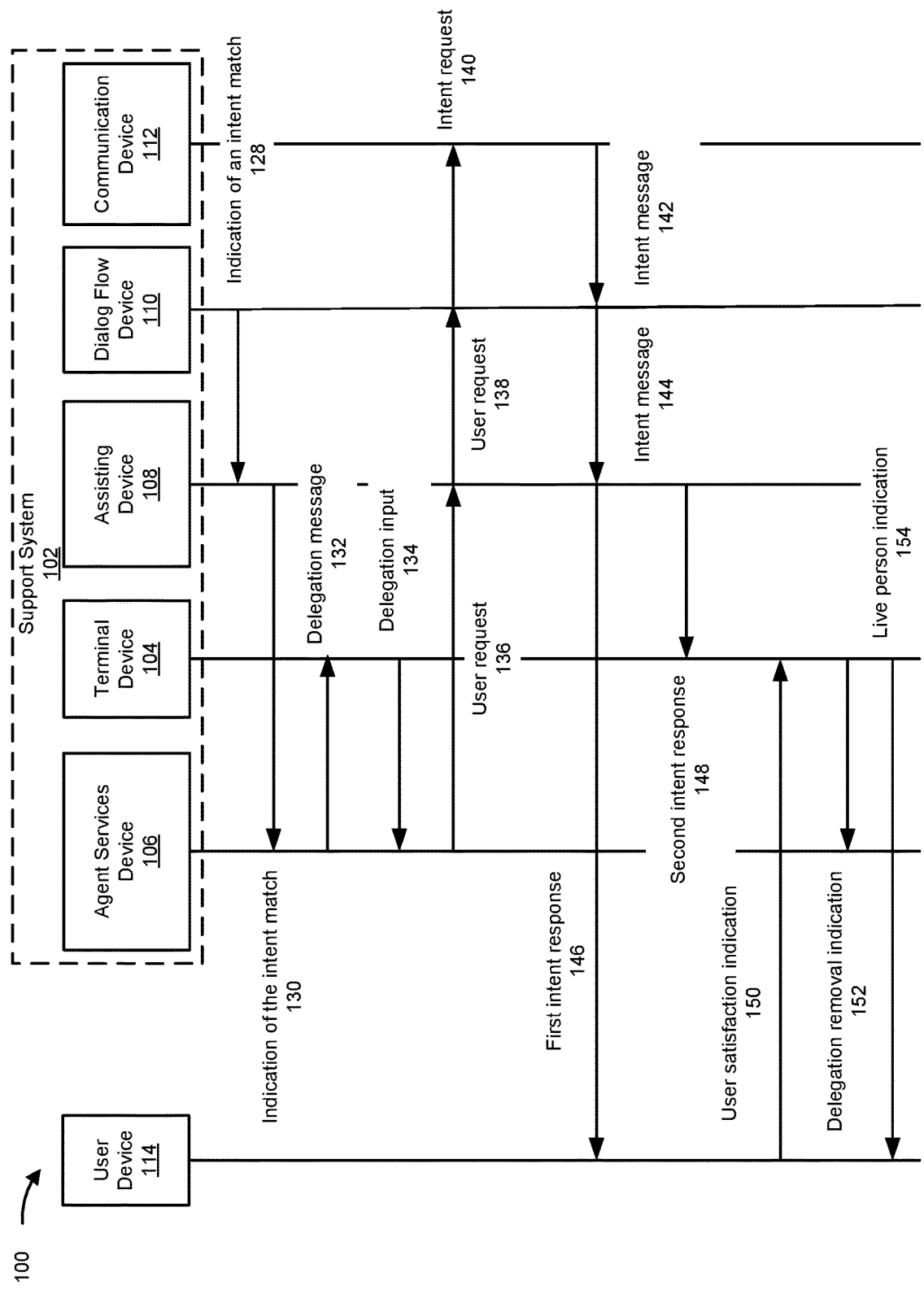

FIGS. 1A-1B are diagrams of an example 100 associated with an enhanced support session using an AI-based conversational assistant. As shown in FIGS. 1A-1B, example 100 includes a support system 102 and a user device 114. The support system 102 may include a terminal device 104, an agent services device 106, an assisting device 108, a dialog flow device 110, and a communication device 112.

In some implementations, the support system 102 may enable communications to be exchanged between the support system 102 (e.g., one or more devices associated with the support system 102) and a user device 114 (e.g., via a communication modality associated with the support system 102) to provide a user with support (e.g., during a support session) using an AI-based conversational assistant in combination with a live agent, as described in more detail elsewhere herein. For example, the support system 102 may provide an interface for interacting with the support system 102 (and/or one or more devices associated with the support system 102) via a web-based application and/or an in-application chat interface (e.g., via an application that is installed on the user device 114).

As shown in FIG. 1A, and by reference number 118, the terminal device 104 may establish initial communications with the user device 114. In some implementations, the user may provide a user interaction (e.g., via the user device 114) that indicates a request to establish the initial communications with the terminal device 104. As an example, the terminal device 104 may establish the initial communications based on detecting the user interaction.

In some implementations, the interface provided by the support system 102 (e.g., via the web-based application and/or the in-application chat interface) may provide an input option (e.g., an "establish initial communications" button) that is displayed via the user device 114. As an example, the user may select (e.g., by pressing the "establish initial communications" button and/or by uttering a command that causes the user device 114 to select the "establish initial communications" button) to indicate the request to establish the initial communications between the user device 114 and the terminal device 104. As an example, the terminal device 104 may establish the initial communications with the user device 114 based on detecting that the input option is selected by the user.

As further shown in FIG. 1A, and by reference number 118, the terminal device 104 may transmit, and the user device 114 may receive, a greeting message. For example, the terminal device 104 may send, and the user device 114 may receive, the greeting message based on the terminal device 104 detecting the user interaction provided by the user device 114. For example, the terminal device 104 may provide the greeting message to the user device 114 in response to detecting that the input option is selected by the user. In some implementations, the greeting message may be a text-based greeting message that includes a prompt for information from the user. For example, the prompt for additional information from the user may be associated with indicating information that prompts the user to indicate a reason for establishing the initial communications with the terminal device 104 (e.g., "How may I help you?").

As further shown in FIG. 1A, and by reference number 120, the terminal device 104 may receive, and the user device 114 may transmit, a support request to establish a support session. For example, the user device 114 may transmit, and the terminal device 104 may receive, the support request to establish the support session based on the prompt for information from the user (e.g., that is indicated via the greeting message provided by the terminal device 104). In some implementations, the support request may indicate a user request, such as a query, a question, and/or a command provided by the user.

As an example, the user request may be a user text input that indicates a reason why the user is requesting support (e.g., "I want to activate my phone."). For example, the user text input may be an utterance of the user (e.g., that is spoken into a microphone component of the user device 114) that is converted to the user text input (e.g., via a speech recognition technique used by the user device 114). As another example, the user text input may be provided by the user interacting with the interface provided by the support system 102 (e.g., via the web-based application and/or the in-application chat interface).

As further shown in FIG. 1A, and by reference number 122, the agent services device 106 may obtain the user request indicated by the support request. In some implementations, the agent services device 106 may be associated with a virtual agent (e.g., the virtual agent may execute on the agent services device 106). For example, the virtual agent may be a computer program that is designed to simulate human conversation and/or to provide automated customer service and/or support (e.g., to one or more devices associated with the support system 102 and/or to the user).

In some implementations, the virtual agent may obtain communications that are exchanged between the user device 114 and the support system 102. For example, the virtual agent may obtain communications that are exchanged between the user device 114 and the terminal device 104. As an example, the virtual agent may obtain the support request based on the user device 114 transmitting the support request to the terminal device 104. In other words, the virtual agent may filter communications between the user device 114 and the terminal device 104. The first virtual agent may analyze the support request to determine whether the support request indicates the user request.

As another example, the agent services device 106 may receive, and the terminal device 104 may transmit, the user request. For example, the terminal device 104 may transmit the user request to the agent services device 106 in response to determining that the support request indicates the user request (e.g., after receiving the support request from the user device 114). Thus, in some implementations, the agent services device 106 may obtain the user request by analyzing the support request (e.g., by obtaining the support request when the support request is transmitted by the user device 114 to the terminal device 104) and/or by obtaining the user request and/or by receiving the user request from the terminal device 104. As an example, the agent services device 106 may communicate with the assisting device 108 based on obtaining the user request, as described in more detail elsewhere herein.

As further shown in FIG. 1A, and by reference number 124, the agent services device 106 may transmit, and the assisting device 108 may receive, the user request. In some implementations, the assisting device 108 may be associated with an automated support agent (e.g., the automated support agent may execute on the assisting device 108). For example, the automated support agent may be an AI-based conversational assistant. As an example, an AI-based conversational assistant may be a computer program that uses AI-based techniques to simulate human conversation and/or to provide automated customer service and/or support. In some implementations, the automated support agent may generate one or more support messages (e.g., associated with the support session) and may automatically provide the one or more support messages to the user device 114, as described in more detail elsewhere herein.

As further shown in FIG. 1A, and by reference number 126, the assisting device 108 may determine an intent associate with the user request. In some implementations, the assisting device 108 may communicate with the dialog flow device 110 to determine the intent associated with the user request. For example, the assisting device 108 may transmit, and the dialog flow device 110 may receive, the user request. In some implementations, the dialog flow device 110 may analyze (e.g., using speech recognition, NLP and/or machine learning techniques) the user request to determine the intent associated with the user request.

For example, the dialog flow device 110 may analyze the text of the user request (e.g., by using NLP and/or machine learning techniques) to determine the intent associated with the user request. As an example, the dialog flow device 110 may classify the user request into one or more intents, such as a support-based intent, a question-based intent, and/or a command-based intent. The support-based intent may be associated with a user request for support. The question-based intent may be associated with a user request for an answer to a question. The command-based intent may be associated with an instruction (e.g., provided by the user) that causes an action to be performed.

For example, if the user request is associated a request for support, then the dialog flow device 110 may determine that the intent associated with the user request is a support-based intent. As an example, if the user request is associated a question, then the dialog flow device 110 may determine that the intent associated with the user request is a question-based intent. As another example, if the user request is associated with a command, then the dialog flow device 110 may determine that the intent associated with the user request is a command-based intent.

As another example, the dialog flow device 110 may determine the intent associated with the user request by using an NLP technique, such as a head intent matching technique, which includes matching information associated with the user request to one or more specific intents. For example, the dialog flow device 110 may analyze the user request by comparing information associated with the user request to a set of intents (e.g., intents that are supported by the automated support agent executing on the agent services device 106) to determine whether the information associated with the user request matches one or more intents of the intents supported by the automated support agent.

In some implementations, to match the information associated with the user request to the one or more specific intents, the dialog flow device 110 may preprocess the user request (e.g., to remove irrelevant elements such as stop words, punctuation, and/or special characters included in the user request). The dialog flow device 110 may tokenize the user request into individual words and/or phrases, which can then be analyzed by the dialog flow device 110. The dialog flow device 110 may identify entities included in the user request, such as names, dates, and/or locations, and may apply a tag to the identified entities that identifies the entities by an entity type. The dialog flow device 110 may extract features from the user request, such as part-of-speech tags, word embeddings, and/or other linguistic features.

The dialog flow device 110 may compare the user request to the set of intents supported by the automated support agent (e.g., by using machine learning techniques and/or machine learning models). The dialog flow device 110 may generate a probability distribution over the set of supported intents that indicates a likelihood associated with whether each intent is a match with respect to the user request. The dialog flow device 110 may calculate a confidence score for each intent, of the set of intents supported by the automated support agent, that indicates the likelihood that the user request matches that intent. The dialog flow device 110 may determine that an intent in the set of intents supported by the automated support agent matches the user request based on the intent satisfying a threshold.

The dialog flow device 110 may generate an intent response based on determining that the user request matches an intent in the set of intents supported by the automated support agent. As an example, the intent response (e.g., generated by the dialog flow device 110) may include a pre-defined response. As another example, the dialog flow device 110 may use a machine learning technique to generate the intent response based on the determining that the user request matches the intent. As shown in FIG. 1B, and by reference number 128, the dialog flow device 110 may transmit an indication of an intent match to the assisting device 108.

As further shown in FIG. 1B, and by reference number 130, the assisting device 108 may transmit, and the agent services device 106 may receive, the indication of the intent match. In some implementations, the virtual agent (e.g., executing on the agent services device 106) may generate a delegation message in response to receiving the indication of the intent match. For example, the delegation message may include an option to enable communications (e.g., support communications) associated with the support session to be exchanged between the user device 114 and the assisting device 108 (e.g., the automated support agent executing on the assisting device 108), as described in more detail elsewhere herein.

In some implementations, the intent response (e.g., associated with the intent match) may be associated with providing support for a task (e.g., requested by the user via the user request), which includes steps that can be incorporated into a workflow. For example, the intent response may be associated with providing support for activating the user device 114 of the user, which includes steps that can be incorporated into an activation workflow. As an example, the activation workflow may indicate that a first step (e.g., associated with the user entering a user input into the user device 114) and a second step (e.g., associated with the user performing a voice call to confirm that the user device 114 is successfully activated) are to be performed to activate the user device 114.

In some implementations, the automated support agent may communicate with the user (e.g., via communications between the assisting device 108 and the user device 114) to provide support for activating the user device 114 of the user. For example, the automated support agent may communicate the first step to the user, may receive a first confirmation message from the user that indicates that the first step has been performed, may communicate the second step to the user, and may receive a second confirmation message from the user that confirms that the second step has been performed. Thus, in some implementations, the delegation message may be associated with providing the live agent with the option to enable the automated support agent to provide support to the user (e.g., by enabling communications to be exchanged between the assisting device 108 and the user device 114).

In this way, the live agent may choose to delegate, to the automated support agent, providing support for tasks that may be handled by the automated support agent. This enables the live agent to provide support (e.g., for other users) that the live agent would not have otherwise been able to provide (e.g., because the live agent would be providing support for the tasks that may be handled by the automated support agent rather than the automated support agent providing the support for the tasks). Although the live agent has been described as having a choice to delegate, to the automated support agent, providing support for a task associated with activating the user device 114 of the user (e.g., in connection with reference number 130 of FIG. 1B and/or as described in more detail elsewhere herein), the live agent may choose to delegate, to the automated support agent, providing support associated with other tasks that may be handled by the automated support agent. For example, the live agent may choose to delegate, to the automated support agent, providing support for a task associated with troubleshooting the user device 114 of the user (e.g., in association with a user device 114 troubleshooting intent match and/or intent response), a task associated with changing a phone plan associated with the user device 114 and/or the user (e.g., in association with a change phone plan intent match and/or intent response), and/or a task of assisting with add-on features associated with the user device 114 and/or the user (e.g., in association with an add-on feature intent match and/or intent response), among other examples.

As further shown in FIG. 1B, and by reference number 132, the agent services device 106 may transmit, and the terminal device 104 may receive, a delegation message. For example, the agent services device 106 may transmit, and the terminal device 104 may receive the delegation message in response to the first virtual generating the delegation message. In this way, the live agent that operates the terminal device may determine whether to enable the communications associated with the support session to be exchanged between the user device 114 and the assisting device 108, as described in more detail elsewhere herein.

As further shown in FIG. 1B, and by reference number 134, the terminal device 104 may transmit, and the agent services device 106 may receive, a delegation input. In some implementations, the delegation input may be associated with a live agent interaction of the live agent that operates the terminal device 104. For example, the live agent may interact with the interface provided via the terminal device 104. As an example, the live agent interaction may indicate whether the live agent has selected the option included in the delegation message. As an example, if the live agent determines to enable the communications to be exchanged between the user device 114 and the assisting device 108 (e.g., to allow the automated support agent executed on the assisting device 108 to perform one or more tasks or generate one or more support messages associated with the intent matched to the intent of the user utterance), then the live agent interaction may indicate that the live agent selected the option includes in the delegation message. As another example, if the live agent does not determine to enable the communications between the user device 114 and the assisting device 108, then the live person interaction may indicate that the live agent does not select the option included in the delegation message and the support session may continue between the user device 114 and the terminal device 104 only.

As further shown in FIG. 1B, and by reference number 136, the agent services device 106 may transmit, and the assisting device 108 may receive, the user request. In some implementations, the agent services device 106 may transmit the user request to the assisting device 108 in response to receiving the live agent interaction (e.g., provided by the live agent that operates the terminal device 104) that indicates that the live agent selects the option included in the delegation message. As an example, the agent services device 106 may transmit the user request to the assisting device 108 to enable the assisting device 108 to communicate with the dialog flow device 110 (e.g., to obtain the intent response generated by the dialog flow device 110, as described in more detail elsewhere herein).

As further shown in FIG. 1B, and by reference number 138, the assisting device 108 may transmit, and the dialog flow device 110 may receive, an indication of the user request. As an example, the assisting device 108 may transmit the communicate with the dialog flow device 110 to obtain the intent response generated by the dialog flow device 110 as described in connection with reference number 126 of FIG. 1A and/or as described in more detail elsewhere herein).

As further shown in FIG. 1B, and by reference number 140, the dialog flow device 110 may transmit, and the communication device 112 (e.g., a webhook device that communicates with a server device) may receive, an intent request. For example, the dialog flow device 110 may transmit the intent request to the communication device 112 (e.g., the webhook device) to obtain information associated with the intent response, such as information to be included in the intent response (e.g., based on the intent match) that is stored in memory of a server device (e.g., a server device that is associated with a third party). In some implementations, the intent request may include information associated with an event. For example, the intent request may indicate that the live agent selects the option included in the delegation message to enable the communications to be exchanged between the user device 114 and the assisting device 108 and/or that the communications to be exchanged between the user device 114 and the assisting device 108 include the intent response (e.g., that is generated by the dialog flow device 110 based on the intent match). The communication device 112 may generate an intent response, as described in more detail elsewhere herein.

As further shown in FIG. 1B, and by reference number 142, the communication device 112 may transmit, and the dialog flow device 110 may receive, the intent response. As an example, the intent response (e.g., generated by the communication device 112) may include a first intent response and a second intent response. For example, the first intent response may include a payload that may be provided to the user device 114 via the interface associated with the support system 102 (e.g., the intent response included in the first intent response may be rendered via the web-based application and/or the in-application chat interface associated with the support system 102 on the user device 114).

As another example, the second intent response may include a payload that may be provided to the terminal device 104 via the interface associated with the support system 102 (e.g., the intent response included in the second intent response may be rendered via the web-based application and/or the in-application chat interface on the terminal device 104). In this way, the intent response generated by the dialog flow device 110, which may include information obtained via the communication device 112, may be viewable by the user that operates the user device 114 and the live agent that operates the terminal device 104 at a same time or a similar time, as described in more detail elsewhere herein. As further shown in FIG. 1B, and by reference number 144, the dialog flow device 110 may transmit, and the assisting device 108 may receive the intent response.

As further shown in FIG. 1B, and by reference number 146, the assisting device 108 may transmit, and the user device 114 may receive, the first intent response (e.g., that is included in the intent response generated by the communication device 112). For example, because the first intent response includes a payload that may be provided to the user device 114 via the interface associated with the support system 102, the intent response may be provided for display via the user device 114 (e.g., the intent response included in the first intent response may be rendered via the web-based application and/or the in-application chat interface associated with the support system 102 on the user device 114).

As further shown in FIG. 1B, and by reference number 148, the assisting device 108 may transmit, and the terminal device 104 may receive, the second intent response (e.g., that is included in the intent response generated by the communication device 112). For example, because the second intent response includes a payload that may be provided to the terminal device 104 via the interface associated with the support system 102, the intent response may be provided for display via the terminal device 104 116 (e.g., the intent response included in the second intent response may be rendered via the web-based application and/or the in-application chat interface associated with the support system 102 on the terminal device 104).

As further shown in FIG. 1B, and by reference number 150, the user device 114 may transmit, and the terminal device 104 may receive, a user satisfaction indication. In some implementations, the user may provide the user satisfaction indication by interacting with the interface associated with the support system 102 (e.g., that is displayed via the user device 114). As an example, the user may provide the user satisfaction indication to the terminal device 104 based on determining that the intent response (e.g., provided via the first intent response) satisfies the user request. Thus, in some implementations, the dialog may continue in one or more iterations, and each utterance provided by the user may be responded to by the live agent and/or an automated support agent having a capability to process the intent of the current utterance.

As further shown in FIG. 1B, and by reference number 152, the terminal device 104 may transmit, and the agent services device 106 may receive, a delegation removal indication. In some implementations, the delegation removal indication may include a cease message that includes an option to cease exchanging the support communications between the user device 114 and the assisting device 108 associated with the support system 102. As an example, the live agent may provide the delegation removal indication in response to receiving the user satisfaction indication. Although the live agent has been described as providing the delegation removal indication in response to receiving the user satisfaction indication in connection with reference number 152 of FIG. 1B and/or as described in more detail elsewhere herein, the live agent may provide the delegation removal indication at any suitable time during the support session. For example, the live agent may provide the delegation removal indication before all of the issues associated with the user have been resolved 9 e.g., by the automated support agent executing on the assisting device 108.

As further shown in FIG. 1B, and by reference number 154, the terminal device 104 may transmit, and the user device 114 may receive, a live agent indication. As an example, the terminal device 104 may transmit, and the user device 114 may receive, the live agent indication based on the delegation removal indication. In some implementations, the live agent indication may be a text-based indication that includes a prompt associated with whether the user has an additional request (e.g., to be handled during the support session).

In this way, the support system enables the live agent to provide support to one or more users more efficiently (e.g., because the assisting device automatically performs operations that would have otherwise been performed less efficiently or less accurately by the live agent). For example, the assisting device may use AI-based techniques to automatically obtain information, analyze information (e.g., to understand the information), generate information (e.g., support communications and/or support responses), and/or perform tasks that otherwise would have to be performed by the live agent. As a result, a duration of support sessions may be shortened (e.g., relative to support sessions in which with the live agent using the information technology tools to perform all tasks associated with the support session), which conserves resources. Furthermore, because the live agent does not perform tasks that are performed by the assisting device, the live agents is able to more efficiently provide support to multiple users during concurrent support sessions.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
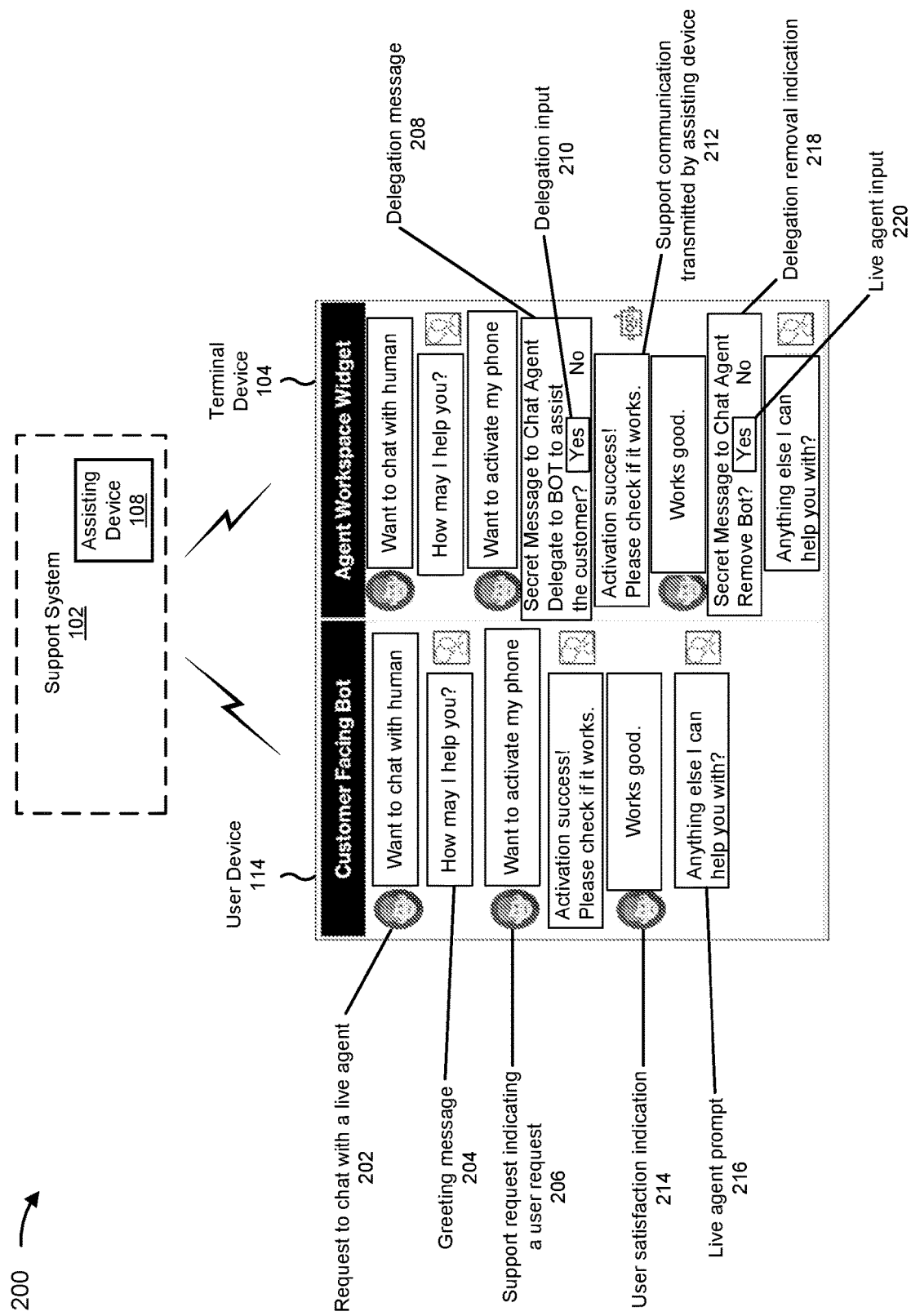
FIG. 2 is a diagram of an example associated with an enhanced support session using an AI-based conversational assistant.

FIG. 2 is a diagram of an example 200 associated with an enhanced support session using an AI-based conversational assistant. As shown in FIG. 2, example 200 includes a support system 102, a terminal device 104, an assisting device 108, and a user device 114. In example 200, a live agent operates the terminal device 104 to provide support to the user that operates the user device 114 during the support session. Further, in example 200, the support system 102 enables communications between the terminal device 104 and the user device 114 via an in-application chat interface (e.g., shown as a customer facing bot interface on the user device 114 and an agent workspace widget on the terminal device 104 in FIG. 2). Thus, in example 200, the user may communicate via user text indications provided via the customer facing bot interface and the live agent may communicate via live agent indications provided via the agent workspace widget, as described in more detail elsewhere herein.

As shown in FIG. 2, and by reference number 202, the user may indicate a request to chat with a live agent. As shown by reference number 204, the live agent may respond with a greeting message in response to the request to chat with the live agent. As shown by reference number 206, the user may indicate a support request indicating a user request. As an example, the user request indicated by the support request may be a request to activate the user device of the user. As shown by reference number 208, the live agent may receive a delegation message. In some implementations, the delegation message may be a message that is viewable only via the agent workspace interface and that is not viewable via the customer facing bot interface.

In other words, the delegation message may be a secret message that is viewable by the live agent but is not viewable by the user. As an example, the delegation message may include an option to enable the assisting device 108 to communicate with the use device 116 (e.g., shown as a yes input option and a no input option in FIG. 2). In some implementations, the delegation message may be presented based on back-end processing that determines that the automated agent running on the assisting device 108 has capabilities to handle the user request based on an intent match. As shown by reference number 210, the live agent may provide a delegation input (e.g., shown as a yes input option selection in FIG. 2). For example, the automated agent executing on the assisting device 108 may perform one or more actions to assist the user with activating the user device 114 of the user based on the live agent selecting the yes input option provided by the delegation message. As shown by reference number 212, a support communication may be transmitted by the assisting device 108.

For example, the support communication may be associated with assisting the user based on the live agents electing the yes option included in the delegation message). As shown by reference number 214, the user may provide a user satisfaction indication. For example, if the assisting device 108 successfully provides support associated with activating the user device 114 of the user, then the user may provide the user satisfaction indication that indicates that the user device 114 is activated. As shown by reference number 216, the live agent may provide a live agent prompt. For example, the live agent prompt may request whether the user has any additional support requests.

As shown by reference number 218, the live agent may provide a delegation removal indication. For example, the assisting device 108 may provide a cease message to the terminal device 108 in response to detecting the user satisfaction indication. As an example, the cease message may include an option to cease exchanging the support communications between the user device 114 and the assisting device 108 associated with the support system (e.g., shown as a yes input option and a no input option in FIG. 2).

As shown by reference number 220, the live agent may provide a live agent input (e.g., shown as a yes input option selection in FIG. 2). For example, the assisting device 108 may cease support communications with user device 114 based on the live agent selecting the yes input option provided by the cease message.

In this way, the support system enables the live agent to provide support to one or more users more efficiently (e.g., because the assisting device automatically performs operations that would have otherwise been performed less efficiently or less accurately by the live agent). For example, the assisting device may use AI-based techniques to automatically obtain information, analyze information (e.g., to understand the information), generate information (e.g., support communications and/or support responses), and/or perform tasks that otherwise would have to be performed by the live agent. As a result, a duration of support sessions may be shortened (e.g., relative to support sessions in which with the live agent using the information technology tools to perform all tasks associated with the support session), which conserves resources. Furthermore, because the live agent does not perform tasks that are performed by the assisting device, the live agents is able to more efficiently provide support to multiple users during concurrent support sessions.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
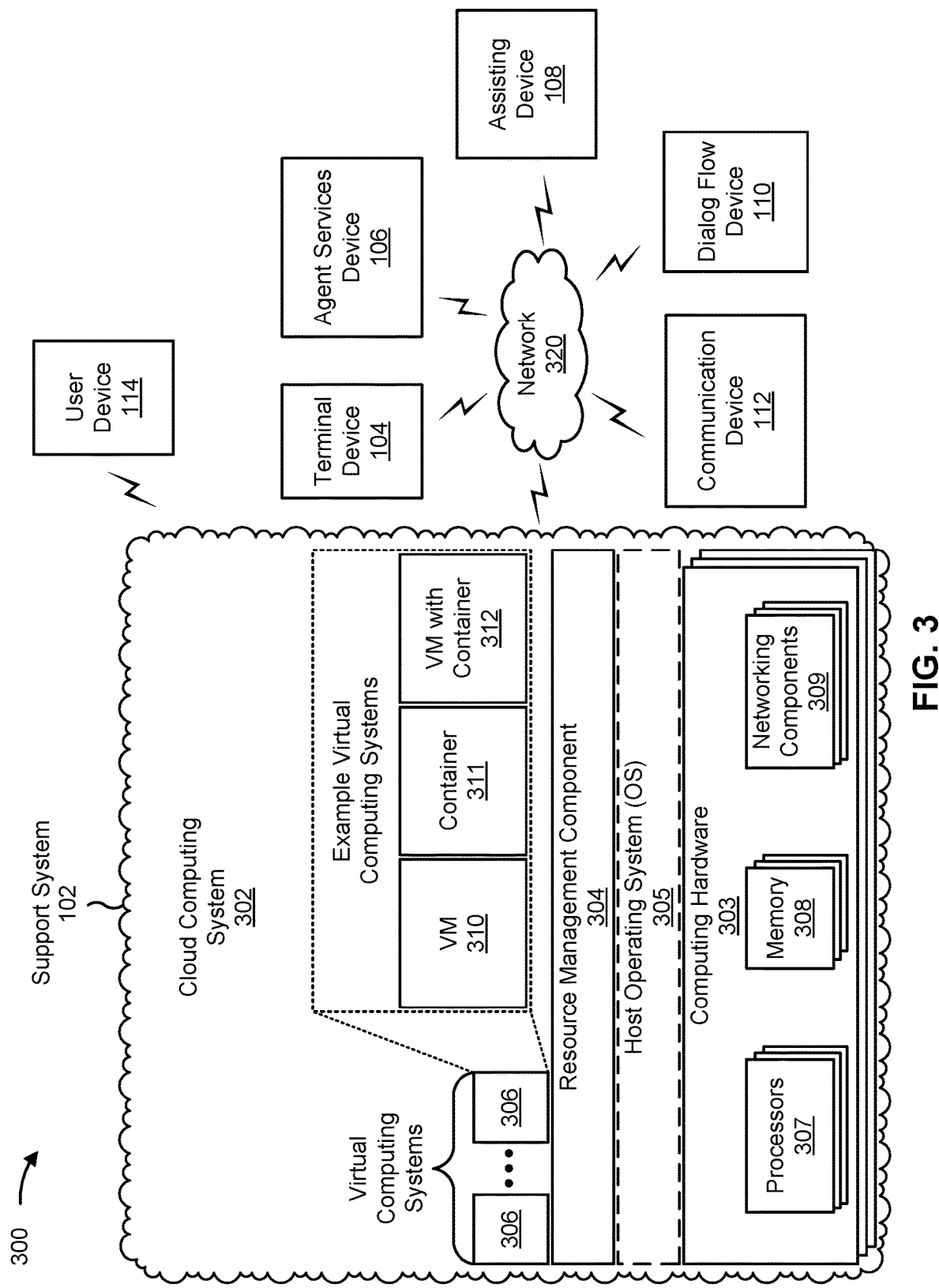
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a support system 102, which may include one or more elements of and/or may execute within a cloud computing system 302. The cloud computing system 302 may include one or more elements 303-312, as described in more detail below. As further shown in FIG. 3, environment 300 may include a network 320, a terminal device 104, an agent services device 106, an assisting device 108, a dialog flow device 110, a communication device 112, and/or a user device 114. The support system 102 may be used to communicate with the user device 114. Devices and/or elements of environment 300 may interconnect via wired connections and/or wireless connections.

The terminal device 104 may include one or more devices capable of receiving, generating, storing, processing, and/or providing information associated with an enhanced support session using an AI-based conversational, as described elsewhere herein. The terminal device 104 may include a communication device and/or a computing device. For example, the terminal device 104 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the terminal device 104 may include computing hardware used in a cloud computing environment (e.g., the cloud computing system 302 associated with the support system 102).

The agent services device 106 may include one or more devices capable of receiving, generating, storing, processing, providing, and/or routing information associated with an enhanced support session using an AI-based conversational assistant, as described elsewhere herein. The agent services device 106 may include a communication device and/or a computing device. For example, the agent services device 106 may include a server, such as an application server, a client server, a web server, a database server, a host server, a proxy server, a virtual server (e.g., executing on computing hardware), or a server in a cloud computing system. In some implementations, the agent services device 106 may include computing hardware used in a cloud computing environment (e.g., the cloud computing system 302 associated with the support system 102).

The assisting device 108 may include one or more devices capable of receiving, generating, storing, processing, providing, and/or routing information associated with an enhanced support session using an AI-based conversational assistant, as described elsewhere herein. The assisting device 108 may include a communication device and/or a computing device. For example, the assisting device 108 may include a server, such as an application server, a client server, a web server, a database server, a host server, a proxy server, a virtual server (e.g., executing on computing hardware), or a server in a cloud computing system. In some implementations, the assisting device 108 may include computing hardware used in a cloud computing environment (e.g., the cloud computing system 302 associated with the support system 102).

The dialog flow device 110 may include one or more devices capable of receiving, generating, storing, processing, providing, and/or routing information associated with an enhanced support session using an AI-based conversational assistant, as described elsewhere herein. The dialog flow device 110 may include a communication device and/or a computing device. For example, the dialog flow device 110 may include a server, such as an application server, a client server, a web server, a database server, a host server, a proxy server, a virtual server (e.g., executing on computing hardware), or a server in a cloud computing system. In some implementations, the dialog flow device 110 may include computing hardware used in a cloud computing environment (e.g., the cloud computing system 302 associated with the support system 102).

The communication device 112 may include one or more devices capable of receiving, generating, storing, processing, providing, and/or routing information associated with an enhanced support session using an AI-based conversational assistant, as described elsewhere herein. The communication device 112 may include a communication device and/or a computing device. For example, the communication device 112 may include a server, such as an application server, a client server, a web server, a database server, a host server, a proxy server, a virtual server (e.g., executing on computing hardware), or a server in a cloud computing system. In some implementations, the communication device 112 may include computing hardware used in a cloud computing environment (e.g., the cloud computing system 302 associated with the support system 102).

The user device 114 may include one or more devices capable of receiving, generating, storing, processing, and/or providing information associated with an enhanced support session using an AI-based conversational assistant, as described elsewhere herein. The user device 114 may include a communication device and/or a computing device. For example, the user device 114 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the support system 102 may include one or more elements 303-312 of the cloud computing system 302, may execute within the cloud computing system 302, and/or may be hosted within the cloud computing system 302, in some implementations, the support system 102 may not be cloud-based (e.g., may be implemented outside of a cloud computing system) or may be partially cloud-based. For example, the support system 102 may include one or more devices that are not part of the cloud computing system 302, such as device 400 of FIG. 4, which may include a stand-alone server or another type of computing device. The support system 102 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
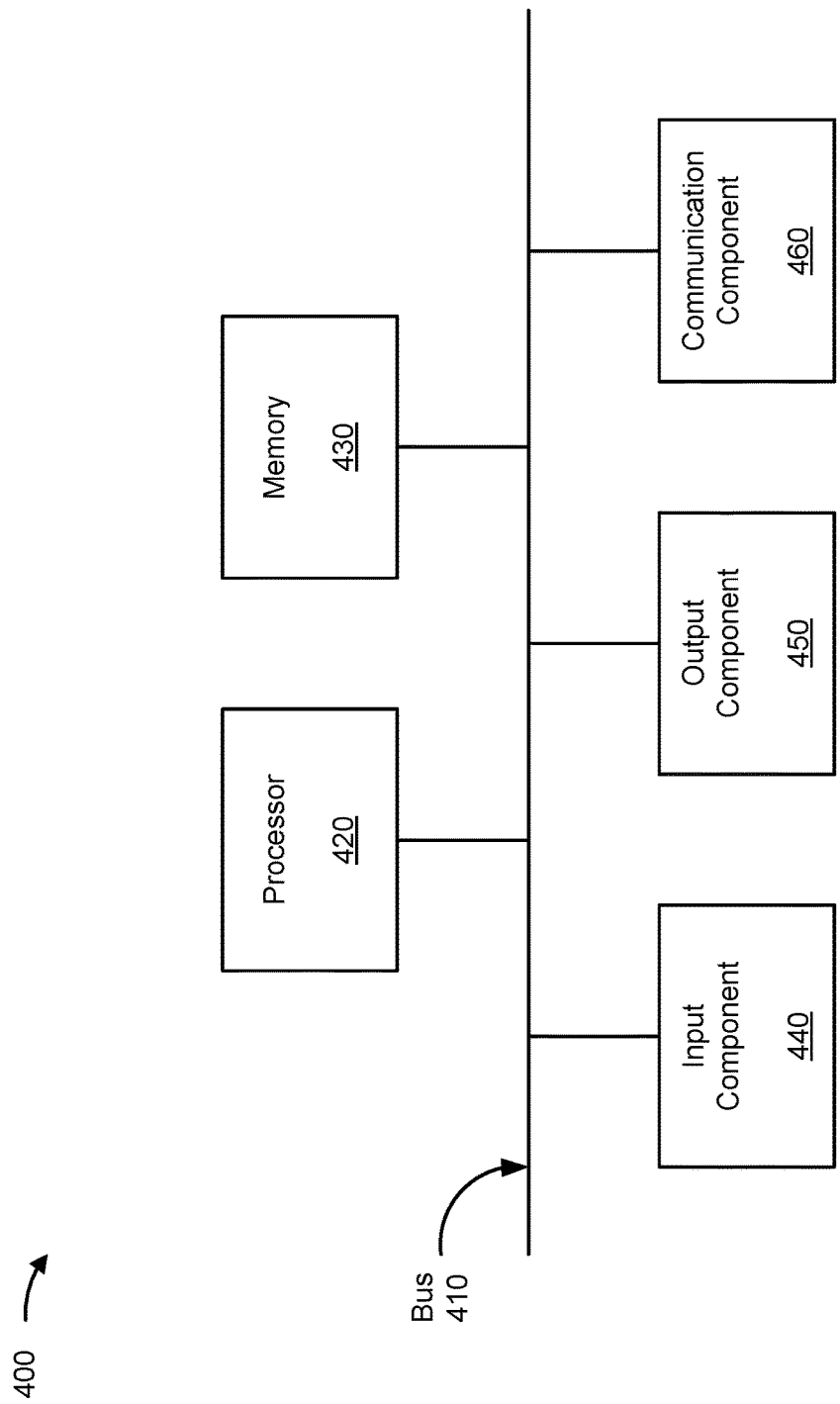
FIG. 4 is a diagram of example components of a device associated with an enhanced support session using an AI-based conversational assistant.

FIG. 4 is a diagram of example components of a device 400 associated with an enhanced support session using an AI-based conversational assistant. The device 400 may correspond to the terminal device 104, the agent services device 106, the assisting device 108, the dialog flow device 110, the communication device 112, and/or the user device 114. In some implementations, the terminal device 104, the agent services device 106, the assisting device 108, the dialog flow device 110, the communication device 112, and/or the user device 114 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
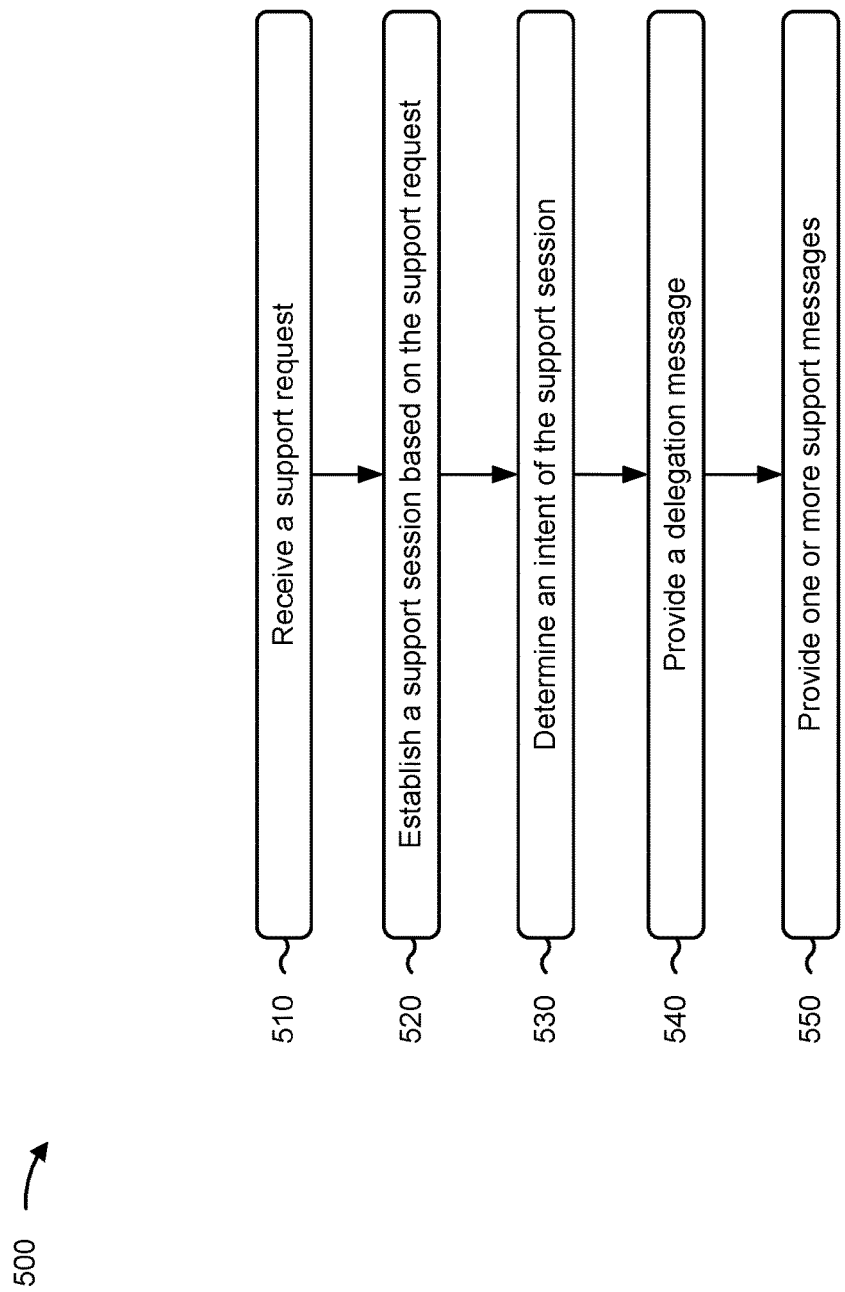
FIG. 5 is a flowchart of an example process associated with an enhanced support session using an AI-based conversational assistant.

FIG. 5 is a flowchart of an example process 500 associated with an enhanced support session using an AI-based conversational assistant. In some implementations, one or more process blocks of FIG. 5 may be performed by a support system (e.g., support system 102). In some implementations, one or more process blocks of FIG. 5 may be performed by another device or a group of devices separate from or including the support system, such as a terminal device (e.g., the terminal device 104), an agent services device (e.g., the agent services device 106), an assisting device (e.g., the assisting device 108), a dialog flow device (e.g., the dialog flow device 110), and/or a communication device (e.g., the communication device 112). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving, from a user device, a support request to setup a support session (block 510). For example, the support system may receive, from a user device, a support request to setup a support session, as described above.

As further shown in FIG. 5, process 500 may include establishing the support session based on the support request (block 520). For example, the support system may establish the support session based on the support request, as described above. In some implementations, establishing the support session includes enabling support communications associated with the support session to be exchanged between a terminal device associated with the support system and the user device.

As further shown in FIG. 5, process 500 may include determining an intent associated with the support session by using artificial intelligence processing to process one or more utterances received from the user device (block 530). For example, the support system may determine an intent associated with the support session by using artificial intelligence processing to process one or more utterances received from the user device, as described above.

As further shown in FIG. 5, process 500 may include providing, to the terminal device, a delegation message (block 540). For example, the support system may provide, to the terminal device, a delegation message, as described above. In some implementations, the delegation message includes an option to enable the support communications associated with the support session to be exchanged between the user device and an assisting device associated with the support system. In some implementations, the assisting device executes an automated support agent.

As further shown in FIG. 5, process 500 may include providing one or more support messages generated by the automated support agent to the user device based on a selection of the option included in the delegation message (block 550). For example, the support system may provide one or more support messages generated by the automated support agent to the user device based on a selection of the option included in the delegation message, as described above.

In some implementations, process 500 may include providing, to the user device, one or more responses generated by the automated support agent executed on the assisting device, wherein the one or more responses are associated with the one or more utterances. As an example, process 500 may include providing, to the terminal device, information that provides a context associated with the one or more support messages generated by the automated support agent during the support session. As another example, process 500 may include providing, to the terminal device, a cease message, wherein the cease message includes an option to cease exchanging the support communications between the user device and the assisting device associated with the support system.

In some implementations, the one or more support messages generated by the automated support agent are associated with at least one of a text communication modality, or a voice communication modality. As an example, the one or more support messages generated by the automated support agent are associated with at least one of an in-application communication modality, or a web-based communication modality.

In some implementations, determining the intent associated with the support session by using the artificial intelligence processing to process the one or more utterances received from the user device comprises processing the one or more utterances using natural language processing to extract request information, determining whether the request information matches one or more specific intents supported by the automated support agent, and generating the delegation message based on determining that the request information matches the one or more specific intents supported by the automated support agent.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a support system and from a user device, a support request to setup a support session;
   establishing, by the support system, the support session based on the support request,
      wherein establishing the support session includes enabling support communications associated with the support session to be exchanged between a terminal device associated with the support system and the user device;
   determining, by the support system, an intent associated with the support session by using artificial intelligence processing to process one or more utterances received from the user device;
   providing, by the support system and to the terminal device, a delegation message,
      wherein the delegation message includes an option to enable the support communications associated with the support session to be exchanged between the user device and an assisting device associated with the support system,
      wherein the assisting device executes an automated support agent;
   providing, by the support system, one or more support messages generated by the automated support agent to the user device based on a selection of the option included in the delegation message; and
   providing, by the support system, to the terminal device, and based on detecting an indication associated with satisfaction related to the one or more support messages, a delegation removal indication that includes an option for the assisting device to cease the support communications with the user device.

2. The method of claim 1, further comprising:
   providing, to the user device, one or more responses generated by the automated support agent executed on the assisting device,
      wherein the one or more responses are associated with the one or more utterances.

3. The method of claim 1, further comprising:
   providing, to the terminal device, information that provides a context associated with the one or more support messages generated by the automated support agent during the support session.

4. The method of claim 1, wherein the one or more support messages generated by the automated support agent are associated with at least one of:
   a text communication modality, or
   a voice communication modality.

5. The method of claim 1, wherein the one or more support messages generated by the automated support agent are associated with at least one of:
   an in-application communication modality, or
   a web-based communication modality.

6. The method of claim 1, wherein determining the intent associated with the support session by using the artificial intelligence processing to process the one or more utterances received from the user device comprises:
   processing the one or more utterances using natural language processing to extract request information;
   determining whether the request information matches one or more specific intents supported by the automated support agent; and
   generating the delegation message based on determining that the request information matches the one or more specific intents supported by the automated support agent.

7. A support system, comprising:
   one or more processors configured to:
      receive from a user device, a support request to setup a support session;
      establish the support session based on the support request,
         wherein establishing the support session includes enabling support communications associated with the support session to be exchanged between a terminal device associated with the support system and the user device;
      determine an intent associated with the support session by using artificial intelligence processing to process one or more utterances received from the user device;
      provide, to the terminal device, a delegation message,
         wherein the delegation message includes an option to enable the support communications associated with the support session to be exchanged between the user device and an assisting device associated with the support system, wherein the assisting device executes an automated support agent;
provide, by the support system, one or more support messages generated by the automated support agent to the user device based on a selection of the option included in the delegation message; and
provide, by the support system, to the terminal device, and based on detecting an indication associated with satisfaction related to the one or more support messages, a cease message that includes an option for the assisting device to cease the support communications with the user device.

8. The support system of claim 7, wherein the one or more processors are further configured to:
provide, to the user device, one or more responses generated by the automated support agent executed on the assisting device,
wherein the one or more responses are associated with the one or more utterances.

9. The support system of claim 7, wherein the one or more processors are further configured to:
provide, to the terminal device, information that provides a context associated with the one or more support messages generated by the automated support agent during the support session.

10. The support system of claim 7, wherein the one or more support messages generated by the automated support agent are associated with at least one of:
a text communication modality, or
a voice communication modality.

11. The support system of claim 7, wherein the one or more support messages generated by the automated support agent are associated with at least one of:
an in-application communication modality, or
a web-based communication modality.

12. The support system of claim 7, wherein the one or more processors, to determine the intent associated with the support session by using the artificial intelligence processing to process the one or more utterances received from the user device, are configured to:
process the one or more utterances using natural language processing to extract request information;
determine whether the request information matches one or more specific intents supported by the automated support agent; and
generate the delegation message based on determining that the request information matches the one or more specific intents supported by the automated support agent.

13. The support system of claim 7, wherein the one or more processors, to determine the intent associated with the support session by using the artificial intelligence processing to process the one or more utterances received from the user device, are configured to:
compare the support request to a plurality of intents supported by the automated support agent, and
match the support request to the intent associated with the support session based on the intent associated with the support session satisfying a threshold.

14. The support system of claim 7, wherein the one or more processors are further configured to:
generate, based on determining the intent and using a machine learning technique, an intent response,
wherein the intent response is associated with providing support related to the support request.

15. The support system of claim 7, wherein the one or more processors are further configured to:
provide the cease message before the support request is resolved.

16. A non-transitory computer-readable medium storing a set of instructions, the set of instructions comprising:
one or more instructions that, when executed by one or more processors of a support system, cause the support system to:
receive from a user device, a support request to setup a support session;
establish the support session based on the support request,
wherein establishing the support session includes enabling support communications associated with the support session to be exchanged between a terminal device associated with the support system and the user device;
determine an intent associated with the support session by using artificial intelligence processing to process one or more utterances received from the user device;
provide, to the terminal device, a delegation message,
wherein the delegation message includes an option to enable the support communications associated with the support session to be exchanged between the user device and an assisting device associated with the support system,
wherein the assisting device executes an automated support agent;
provide, by the support system, one or more support messages generated by the automated support agent to the user device based on a selection of the option included in the delegation message; and
provide, by the support system, to the terminal device, and based on detecting an indication associated with satisfaction related to the one or more support messages, a cease message that includes an option to cease exchanging the support communications between the user device and the assisting device.

17. The non-transitory computer-readable medium of claim 16, wherein the one or more instructions, when executed by the one or more processors, further cause the support system to:
provide, to the user device, one or more responses generated by the automated support agent executed on the assisting device,
wherein the one or more responses are associated with the one or more utterances.

18. The non-transitory computer-readable medium of claim 16, wherein the one or more instructions, when executed by the one or more processors, further cause the support system to:
provide, to the terminal device, information that provides a context associated with the one or more support messages generated by the automated support agent during the support session.

19. The non-transitory computer-readable medium of claim 16, wherein the one or more support messages generated by the automated support agent are associated with at least one of:
a text communication modality, or
a voice communication modality.

20. The non-transitory computer-readable medium of claim 16, wherein the one or more instructions, when executed by the one or more processors that cause the support system to determine the intent associated with the support session by using the artificial intelligence processing to process the one or more utterances received from the user device, further cause the support system to:
- process the one or more utterances using natural language processing to extract request information;
- determine whether the request information matches one or more specific intents supported by the automated support agent; and
- generate the delegation message based on determining that the request information matches the one or more specific intents supported by the automated support agent.

* * * * *